United States Patent
Song et al.

(10) Patent No.: US 8,599,710 B2
(45) Date of Patent: Dec. 3, 2013

(54) MOBILE APPARATUS SUPPORTING CONTEXT MONITORING, METHOD OF MONITORING CONTEXT USING THE SAME AND CONTEXT MONITORING SYSTEM HAVING THE SAME

(75) Inventors: June-Hwa Song, Daejeon (KR); Yun-Seok Rhee, Seongnam-si (KR); Young-Ki Lee, Daejeon (KR); Chul-Hong Min, Seoul (KR); Young-Hyun Ju, Gwangju (KR); Tai-Woo Park, Daejeon (KR); Jin-Won Lee, Daejeon (KR); Seung-Woo Kang, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 332 days.

(21) Appl. No.: 13/036,521

(22) Filed: Feb. 28, 2011

(65) Prior Publication Data
US 2011/0310751 A1 Dec. 22, 2011

(30) Foreign Application Priority Data
Jun. 21, 2010 (KR) .......................... 10-2010-0058482

(51) Int. Cl.
*H04L 12/26* (2006.01)
(52) U.S. Cl.
USPC ........................................................ 370/252
(58) Field of Classification Search
USPC ............ 370/241, 252; 455/403, 414.1, 414.2, 455/414.3
See application file for complete search history.

(56) References Cited

U.S. PATENT DOCUMENTS

| | | | | |
|---|---|---|---|---|
| 7,065,568 | B2 * | 6/2006 | Bracewell et al. | 709/223 |
| 7,450,959 | B2 * | 11/2008 | Lin et al. | 455/550.1 |
| 7,855,639 | B2 * | 12/2010 | Patel et al. | 340/539.2 |
| 7,907,934 | B2 * | 3/2011 | Naghian | 455/410 |
| 8,073,436 | B2 * | 12/2011 | Yaqub et al. | 455/418 |
| 2004/0192353 | A1 * | 9/2004 | Mason et al. | 455/457 |
| 2006/0149905 | A1 * | 7/2006 | Park et al. | 711/141 |
| 2006/0241954 | A1 * | 10/2006 | Jeng et al. | 705/1 |
| 2008/0248789 | A1 * | 10/2008 | Song et al. | 455/414.3 |
| 2009/0157419 | A1 * | 6/2009 | Bursey | 705/1 |
| 2010/0007483 | A1 * | 1/2010 | Oh et al. | 340/521 |
| 2010/0076777 | A1 * | 3/2010 | Paretti et al. | 705/1 |
| 2010/0081411 | A1 * | 4/2010 | Montenero | 455/404.2 |
| 2010/0211594 | A1 * | 8/2010 | Penders et al. | 707/769 |

OTHER PUBLICATIONS

Kang et al., "Orchestrator: An Active Resource Orchestration Framework for Mobile Context Monitoring in Sensor-rich Mobile Environments", IEEE PerCom Workshop on Mar. 31, 2010.

* cited by examiner

*Primary Examiner* — Chi Pham
*Assistant Examiner* — Robert Lopata
(74) *Attorney, Agent, or Firm* — Womble Carlyle Sandridge & Rice, LLP (57) ABSTRACT

A mobile apparatus includes a processing planner and a plan processor. The processing planner generates a plurality of resource use plans in response to a context monitoring query (CMQ) of an application, and selects a final plan satisfying a request of the CMQ among the resource use plans. The plan processor executes the final plan. Accordingly, the mobile apparatus may support resource-efficient context monitoring.

32 Claims, 9 Drawing Sheets

| RAM | CPU(%) | MEM(KB) | BW(pkt/s) | ENERGY(J) |
|---|---|---|---|---|
| MOBILE | 63.22 | 56285 | 25.5 | 9256 |
| ACCEL on watch | 97.83 | 1.064 | 25.5 | 8253 |
| ACCEL on waist | 85.25 | 1.925 | 25.5 | 10258 |

FIG. 9

| RDM | CPU(%) | MEM(B) | BW(pkt/s) | ENERGY(mJ/s) |
|---|---|---|---|---|
| MOBILE | 3.32 | 4571K | 24.125 | 6621 |
| ACCEL on L.Wrist | 11.71 | 20 | 21 | 29.28 |
| ACCEL on R.Thigh | 3.43 | 768 | 4.125 | 25.64 |

MOBILE APPARATUS SUPPORTING CONTEXT MONITORING, METHOD OF MONITORING CONTEXT USING THE SAME AND CONTEXT MONITORING SYSTEM HAVING THE SAME

CROSS-REFERENCE TO RELATED APPLICATIONS

This application claims priority under 35 U.S.C. §119 to Korean Patent Application No. 10-2010-0058482, filed on Jun. 21, 2010 in the Korean Intellectual Property Office (KIPO), the contents of which are herein incorporated by reference in its entirety.

BACKGROUND OF THE DISCLOSURE

1. Technical Field

Example embodiments relate to a mobile apparatus supporting context monitoring, a method of monitoring a context using the mobile apparatus and a context monitoring system having the mobile apparatus. More particularly, example embodiments relate to a mobile apparatus supporting context monitoring, capable of actively adjusting resources, a method of monitoring a context using the mobile apparatus and a context monitoring system having the mobile apparatus.

2. Description of the Related Art

Recent paradigm of information communication technology may be a ubiquitous computing, a ubiquitous network, a pervasive computing and so on. "Ubiquitous" means that a user may easily get any desired information anytime and anywhere. In an upcoming ubiquitous age, smart objects, having computing and communication function, may recognize a dynamic environment and be adaptive to the dynamic environment. In other words, the smart objects may have a context awareness feature.

A personal area network (PAN) is one of the core technologies realizing the ubiquitous network having the context awareness feature. The PAN is a network which is provided to a person to communicate in a close range. The person using the PAN may be connected with various devices in about 10 m with respect to the person.

The PAN is suitable for a context-aware application, which provides proper services in response to an action of the user, a status of the user and an environment around the user. In the PAN environment, the network is operated around the person so that a portable mobile apparatus, capable of receiving data from various sensors and outputting context information to the context aware applications, may be a core platform. For example, a mobile terminal may recognize a context of the user by collecting and analyzing the sensed data, and may provide recognized context information to the context aware application. The context aware application may provide proper services to the user according to the context of the user. Accordingly, the mobile apparatus capable of supporting a number of the context aware applications may be necessary.

The portable mobile apparatus supporting the context aware application may have poor computing resources in the computing platform in the PAN environment. A conventional mobile apparatus binds required resources of a designated apparatus according to an instruction of the context aware application. However, the conventional mobile apparatus does not completely support a dynamic and flexible use of resources with monitoring available resources of various apparatuses. Thus, when a plurality of context aware applications requires resources at the same time, use of the resources of the apparatuses are not coordinated and efficient. Accordingly, the context aware applications may not be seamless and long-running.

Therefore, the resource-efficient mobile apparatus to achieve a coordinated and efficient use of resources and to provide seamless and long-running services of context aware applications is required.

BRIEF SUMMARY OF THE DISCLOSURE

Example embodiments provide a mobile apparatus supporting context monitoring, generating resource use plans and selecting and executing a final plan among the resource use plans to achieve a coordinated and efficient use of resources, and to provide seamless and long-running services of context aware applications.

Example embodiments also provide a method of monitoring a context using the mobile apparatus.

Example embodiments also provide a context monitoring system having the mobile apparatus.

In an example mobile apparatus according to the present inventive concept, the mobile apparatus includes a processing planner and a plan processor. The processing planner generates a plurality of resource use plans in response to a context monitoring query (CMQ) of an application, and selects a final plan that satisfies a request of the CMQ among the resource use plans. The plan processor executes the final plan.

In the present example embodiment, the mobile apparatus may be used in a personal area network (PAN) environment.

In the present example embodiment, the mobile apparatus may further include an application broker configured to communicate with the application.

In the present example embodiment, the mobile apparatus may further include a sensor broker configured to communicate with a sensor. The sensor may provide sensed data.

In the present example embodiment, the resource use plan may include a logical plan and a physical plan. The logical plan may include information about steps to recognize a context. The steps may include a first step of sensing data, a second step of extracting feature data from the sensed data, and a third step of recognizing the context from the feature data. The physical plan may include information about subjects executing the steps. The subjects may include a first subject sensing the data, a second subject extracting the feature data, and a third subject recognizing the context.

In the present example embodiment, the subjects may include the mobile apparatus and a sensor.

In the present example embodiment, the processing planner may detect an available sensor in real time. The processing planner may generate the resource use plans based on the detected available sensor.

In the present example embodiment, the processing planner may include a resource monitor configured to monitor resource use status of the mobile apparatus in real time. The processing planner may select the final plan based on the resource use status of the mobile apparatus.

In the present example embodiment, the processing planner may compare resource availability matrix (RAM) of the mobile apparatus and a sensor in a network to resource demand matrix (RDM) of the resource use plans to select the final plan.

In the present example embodiment, the processing planner may select the final plan of which the RDM is less than the RAM.

In the present example embodiment, the RAM may include information about available CPU cycle, available network bandwidth, available memory space and available energy of the mobile apparatus and the sensor in the network.

In the present example embodiment, the RDM may include information about CPU usage, network bandwidth usage, memory usage and energy usage demanded by the mobile apparatus and the sensor to execute the resource use plan.

In the present example embodiment, the processing planner may include a policy manager that stores a resource use policy defining criteria for selecting the final plan. The processing planner may select the final plan based on the resource use policy stored in the policy manager.

In the present example embodiment, the processing planner may generate a plurality of plan sets that have the resource use plans when a plurality of CMQs exists. The processing planner may select a plurality of first plan sets to maximize the number of CMQs, which are executed at the same time. The processing planner may select a final plan set using the minimum resources among the first plan sets.

In the present example embodiment, the plan processor may include a feature extractor and a context recognizer. The feature extractor may extract feature data from sensed data by a sensor. The context recognizer may recognize a context from the extracted feature data.

In the present example embodiment, the CMQ may include accuracy of context awareness and duration of monitoring a context.

In an example method of monitoring a context, a plurality of resource use plans is generated in response to a context monitoring query (CMQ) of an application. A final plan that satisfies a request of CMQ is selected among the resource use plans. The final plan is executed.

In the present example embodiment, the method of monitoring the context may be used in a personal area network (PAN) environment.

In the present example embodiment, the logical plan that includes information about steps to recognize a context may be generated. The steps may include a first step of sensing data, a second step of extracting feature data from the sensed data, and a third step of recognizing the context from the feature data. The physical plan that includes information about subjects executing the steps may be generated. The subjects may include a first subject sensing the data, a second subject extracting the feature data, and a third subject recognizing the context.

In the present example embodiment, the subjects may include the mobile apparatus and a sensor.

In the present example embodiment, an available sensor may be detected in real time. The resource use plans may be generated based on the detected available sensor.

In the present example embodiment, the final plan may be selected based on the resource use status monitored in real time.

In the present example embodiment, the final plan may be selected by comparing resource availability matrix (RAM) of the mobile apparatus and a sensor in a network to resource demand matrix (RDM) of the resource use plans.

In the present example embodiment, the final plan of which the RDM is less than the RAM may be selected.

In the present example embodiment, the RAM may include information about available CPU cycle, available network bandwidth, available memory space and available energy of the mobile apparatus and the sensor in the network.

In the present example embodiment, the RDM may include information about CPU usage, network bandwidth usage, memory usage and energy usage demanded by the mobile apparatus and the sensor to execute the resource use plan.

In the present example embodiment, the final plan is selected based on a resource use policy defining criteria for selecting the final plan.

In the present example embodiment, a plurality of plan sets that have the resource use plans may be generated when a plurality of CMQs exists. A plurality of first plan sets may be selected to maximize the number of CMQs, which are executed at the same time. A final plan set that uses the minimum resources among the first plan sets.

In the present example embodiment, data may be sensed by a first subject designated according to an instruction of the final plan. Feature data may be extracted from the sensed data by a second subject designated according to an instruction of the final plan. The context may be recognized from the extracted feature data by a third subject designated according to an instruction of the final plan.

In the present example embodiment, the CMQ may include accuracy of context awareness and duration of monitoring a context.

In an example context monitoring system according to the present inventive concept, the context monitoring system includes an application, a mobile apparatus and a sensor. The application requests a context monitoring query (CMQ) and receives an event signal when the CMQ is satisfied. The mobile apparatus includes a processing planner and a plan processor. The processing planner generates a plurality of resource use plans in response to the CMQ of the application, and selects a final plan that satisfies a request of the CMQ among the resource use plans. The plan processor executes the final plan. The sensor executes the final plan.

In the present example embodiment, the context monitoring system may be used in a personal area network (PAN) environment.

In the present example embodiment, the sensor may include a mobile apparatus broker, a plan processor and a resource monitor. The mobile apparatus broker may communicate with the mobile apparatus. The plan processor may execute the final plan. The resource monitor may monitor resource use status of the sensor in real time.

In the present example embodiment, the plan processor may include a sensing part and a feature extractor. The sensing part may sense data. The feature extractor may extract feature data from the sensed data.

According to a mobile apparatus, a method of monitoring a context, and a context monitoring system, resource use plans are generated, a final plan is selected among the resource use plans, and the final plan is executed so that a coordinated and efficient use of resources may be achieved. In addition, seamless and long-running services may be provided.

BRIEF DESCRIPTION OF THE DRAWINGS

The above and other features and advantages of the present disclosure will become more apparent by describing in detailed example embodiments thereof with reference to the accompanying drawings, in which.

DETAILED DESCRIPTION OF THE EMBODIMENTS

The present inventive concept now will be described more fully hereinafter with reference to the accompanying drawings, in which exemplary embodiments of the present invention are shown. The present inventive concept may, however, be embodied in many different forms and should not be construed as limited to the exemplary embodiments set fourth herein. Rather, these exemplary embodiments are provided so that this disclosure will be thorough and complete, and will fully convey the scope of the present invention to those skilled in the art. Like reference numerals refer to like elements throughout.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular exemplary embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the inventive concept as used herein.

Hereinafter, the present inventive concept will be explained in detail with reference to the accompanying drawings.

Figure 1:
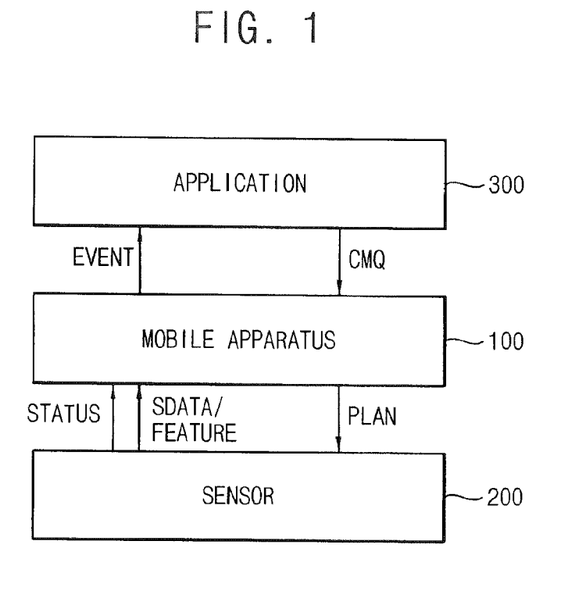
FIG. 1 is a block diagram illustrating a context monitoring system according to an example embodiment of the present inventive concept.

FIG. 1 is a block diagram illustrating a context monitoring system according to an example embodiment of the present inventive concept.

Referring to FIG. 1, the context monitoring system includes a mobile apparatus 100, a sensor 200 and an application 300.

The mobile apparatus 100 receives a context monitoring query (CMQ) from the application 100, and register the CMQ. The mobile apparatus 100 receives sensed data SDATA from the sensor 200, and monitors whether the sensed data SDATA satisfies the context monitoring query CMQ. When a result of the CMQ changes from TRUE to FALSE or FALSE to TRUE, the mobile apparatus 100 provides an event signal EVENT to the application 300, and provides a final plan PLAN selected among resource use plans of the mobile apparatus 100 to the sensor 200. The mobile apparatus 100 executes a portion of the final plan PLAN.

The sensor 200 receives the final plan PLAN from the mobile apparatus 100 to execute a portion of the final plan PLAN. The sensor 200 outputs the sensed data SDATA or feature data FEATURE extracted from the sensed data SDATA to the mobile apparatus 100. The sensor may provide a resource use status STATUS of sensor 200 to the mobile apparatus 100.

For example, the sensor 200 may include plurality of sensors. The sensor 200 may be a light sensor, a temperature sensor, an accelerometer and so on. Accordingly, the sensor 200 may detect light, temperature, acceleration, and so on. The sensor 200 may be a wearable sensor attached to a human body. In addition, the sensor 200 may be included in the mobile apparatus 100.

The sensed data SDATA from the sensor 200 is provided to the mobile apparatus 100, and is used to determine whether the sensed data SDATA satisfies a context required from the application 300.

The application 300 requests the CMQ according to an object of program to the mobile apparatus 100. The mobile apparatus 100 registers the CMQ, and monitors whether the result of the CMQ changes to TRUE or FALSE. When the result of the CMQ changes, the mobile apparatus 100 provides the event signal EVENT to the application 300. The CMQ may include the context, accuracy of context awareness and duration of monitoring the context.

For example, the application 300 may be an exercise assistant application, which monitors a user's activity, and provides information about a quantity of the exercise, a pattern of the exercise. The application 300 may be a health alarming application, which monitors a user's heart rate, and alarms an emergency to the user.

Figure 2:
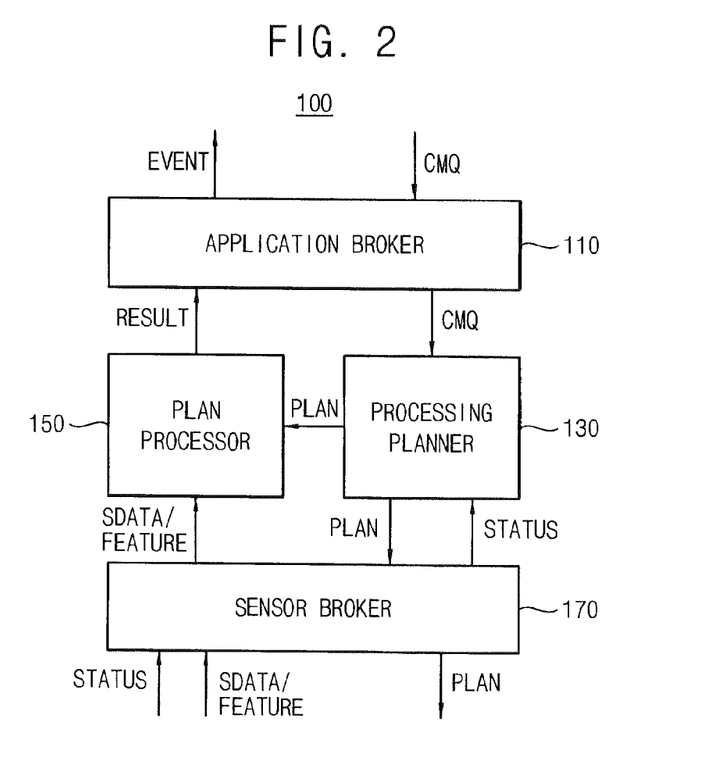
FIG. 2 is a block diagram illustrating a mobile apparatus in the context monitoring system of FIG. 1.

FIG. 2 is a block diagram illustrating a mobile apparatus in the context monitoring system of FIG. 1.

Referring to FIGS. 1 and 2, the mobile apparatus 100 includes an application broker 110, a processing planner 130, a plan processor 150 and a sensor broker 170.

The application broker 110 communicates with the application 300. The application broker 110 receives the CMQ from the application 300, and transmits the CMQ to the processing planner 130. The application broker 110 receives a result signal RESULT from the plan processor 150, and transmits an event signal EVENT corresponding to the result signal RESULT to the application 300.

The processing planner 130 receives the CMQ from the application broker 110, generates the resource use plans corresponding to the CMQ, selects the final plan PLAN among the resource use plans, and outputs the final plan PLAN to the plan processor 150 and the sensor broker 170.

The processing planner 130 may receive the resource use status STATUS of the sensor 200 from the sensor broker 170, and may use the resource use status STATUS for generating the resource use plans and selecting the final plan PLAN.

The plan processor 150 receives the final plan PLAN from the processing planner 130, and executes the final plan PLAN. The plan processor 150 may receive the sensed data SDATA from the sensor broker 170, and may extract the feature data FEATURE from the sensed data SDATA. Alternatively, the plan processor 150 may receive the feature data FEATURE extracted by the sensor 200 from the sensor broker 170.

The plan processor 150 may recognize the context based on the extracted feature data FEATURE or the received feature data FEATURE. The plan processor 150 outputs the result signal RESULT, which includes information about the context, to the application broker 110.

The sensor broker 170 communicates with the sensor 200 which provides the sensed data SDATA. The sensor broker 170 receives the sensed data SDATA and the feature data FEATURE from the sensor 200, and transmits the sensed data SDATA and the feature data FEATURE to the plan processor 150. The sensor broker 170 receives the resource use status STATUS of the sensor 200 from the sensor 200, and transmits the resource use status STATUS to the processing planner 130.

The sensor broker 170 receives the final plan PLAN, and transmits the final plan PLAN to the sensor 200.

Figure 3:
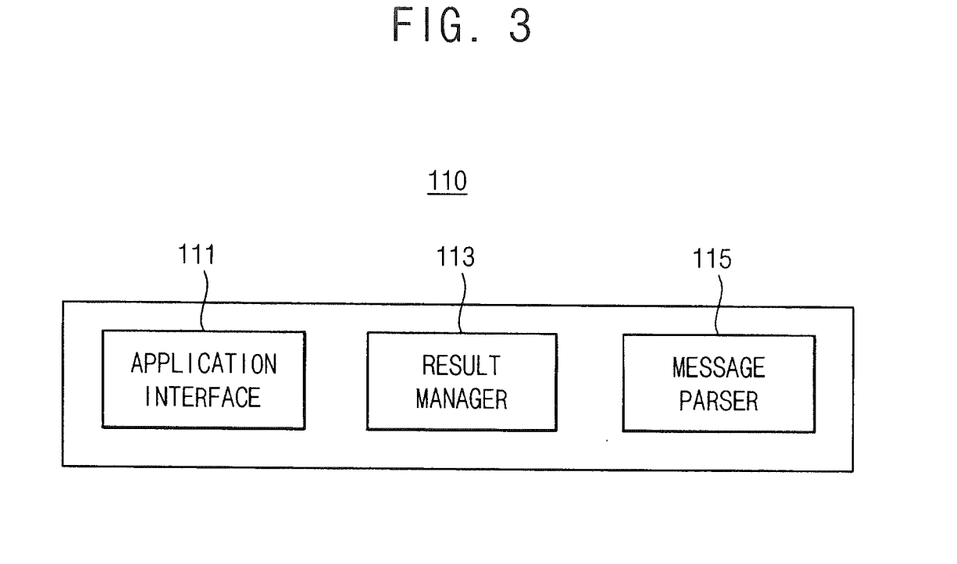
FIG. 3 is a block diagram illustrating an application broker in the mobile apparatus of FIG. 2.

FIG. 3 is a block diagram illustrating an application broker in the mobile apparatus of FIG. 2.

Referring to FIGS. 1 to 3, the application broker 110 may include an application interface (API) 111, a result manager 113 and a massage parser 115.

The API 111 means a development language or a type of a message used for developing the application 300. The API 111 may include a plurality of functions to operate the application 300. The result manager 113 receives the result signal RESULT from the plan processor 150, and outputs the event signal EVENT to the application 300. The message parser 115 parses a message such as the CMQ, and outputs the parsed message to the processing planner 130.

Figure 4:
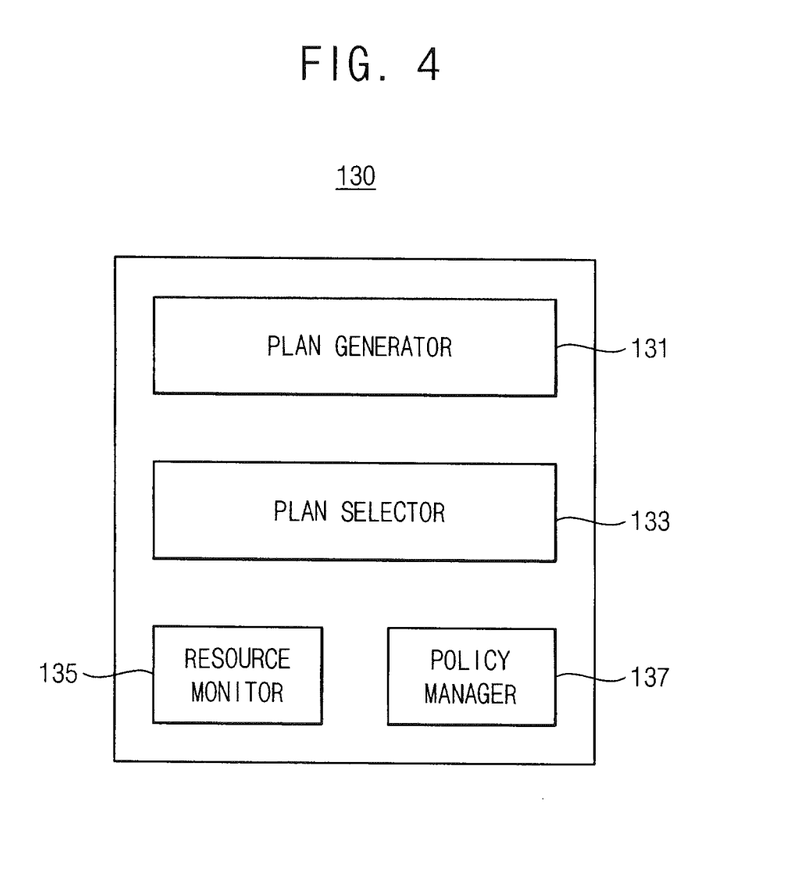
FIG. 4 is a block diagram illustrating a processing planner in the mobile apparatus of FIG. 2.

FIG. 4 is a block diagram illustrating a processing planner in the mobile apparatus of FIG. 2.

Referring to FIGS. 1, 2 and 4, the processing planner 130 may include a plan generator 131, a plan selector 133, a resource monitor 135 and a policy manager 137.

The plan generator 131 receives the CMQ from the application broker 110, and generates a plurality of the resource use plans in response to context information of the CMQ.

The plan selector 133 selects the final plan PLAN, which satisfies a request of the CMQ among the resource use plans. For example, the request of the CMQ may be the accuracy of the context awareness. In addition, the request of the CMQ may include several kinds of information about overall resources of the system. For example, the request of the CMQ may include ranges of central processing unit (CPU) usage, network bandwidth usage, memory usage and energy usage.

The resource monitor 135 monitors resource use status of the mobile apparatus 100 in real time. The plan selector 133 may select the final plan PLAN based on the resource use status of the mobile apparatus 100 and the sensor 200.

The policy manager 137 includes a resource use policy defining criteria for selecting the final plan PLAN. The resource use policy may be directly inputted and modified by the user.

For example, the resource use policy may include a policy to select the final plan PLAN to maximize the number of CMQs, which are executed at the same time, when a plurality of the CMQs exists. The resource use policy may include a policy to select the final plan PLAN to minimize the CPU usage. The resource use policy may include a policy to select the final plan PLAN to minimize the network bandwidth usage. The resource use policy may include a policy to select the final plan PLAN to minimize the memory usage. The resource use policy may include a policy to select the final plan PLAN to minimize the energy usage. The resource use policy may include a policy to select the final plan PLAN to maximize the accuracy of the context awareness. The resource use policy may include a policy to select the final plan PLAN to maximize running duration of the application 300. The resource use policy may define a priority of a specific apparatus or a specific sensor for using resources.

The policy manager 137 may include a plurality of the policies and a priority between the policies.

Figure 5:
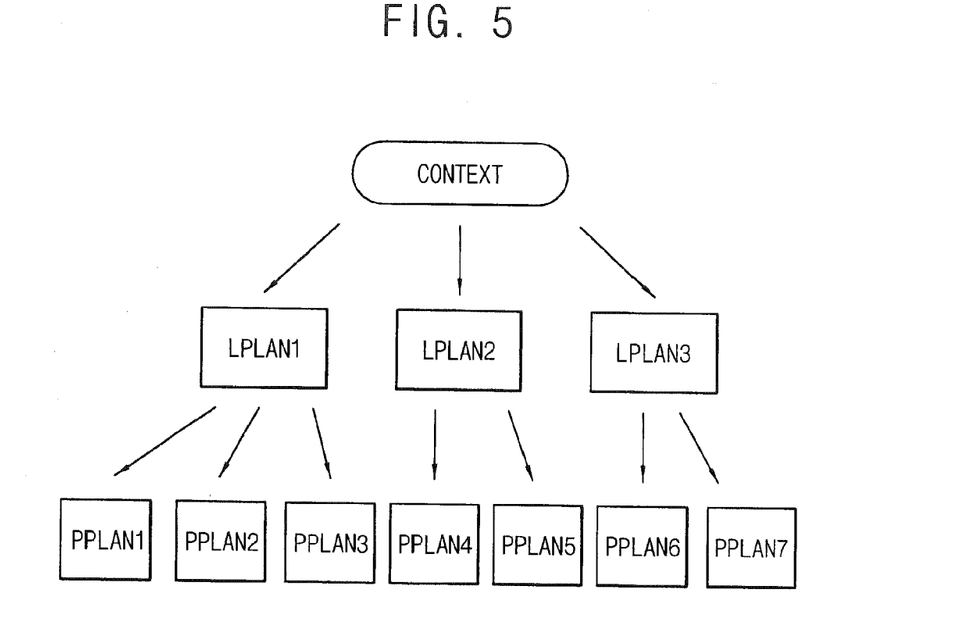
FIG. 5 is a conceptual diagram illustrating a resource use plan generated by the plan generator of FIG. 4.

FIG. 5 is a conceptual diagram illustrating a resource use plan generated by the plan generator of FIG. 4.

Referring to FIGS. 4 and 5, the plan generator 131 generates the resource use plans in response to the context information of the CMQ. The resource use plan includes a logical plan LPLAN and a physical plan PPLAN. The logical plan LPLAN includes information about steps required to recognize the context. The physical plan PPLAN additionally includes information about subjects, such as apparatuses or sensors, executing the steps to recognize the context.

For example, the logical plan LPLAN includes a first step of sensing data SDATA, a second step of extracting the feature data FEATURE from the sensed data SDATA, and a third step of recognizing the context from the feature data FEATURE. The physical plan PPLAN includes a first subject sensing the data SDATA, a second subject extracting the feature data FEATURE, and a third subject recognizing the context.

As shown in FIG. 5, the resource use plans include a plurality of logical plans LPLANs for a single CONTEXT. In addition, the resource use plans include a plurality of physical plans PPLANs for a single logical plan LPLAN. Therefore, the CONTEXT, the logical plans LPLANs and the physical plans PPLANs may form a hierarchical tree structure.

For example, the resource use plans may include a first logical plan LPLAN 1, a second logical plan LPLAN2 and a third logical plan LPLAN3 for the CONTEXT. The resource use plans may include a first physical plan PPLAN1, a second physical plan PPLAN2 and a third physical plan PPLAN3 for the first logical plan LPLAN1. The resource use plans may include a fourth physical plan PPLAN4 and a fifth physical plan PPLAN5 for the second logical plan LPLAN2. The resource use plans may include a sixth physical plan PPLAN6 and a seventh physical plan PPLAN7 for the third logical plan LPLAN3.

Figure 6:
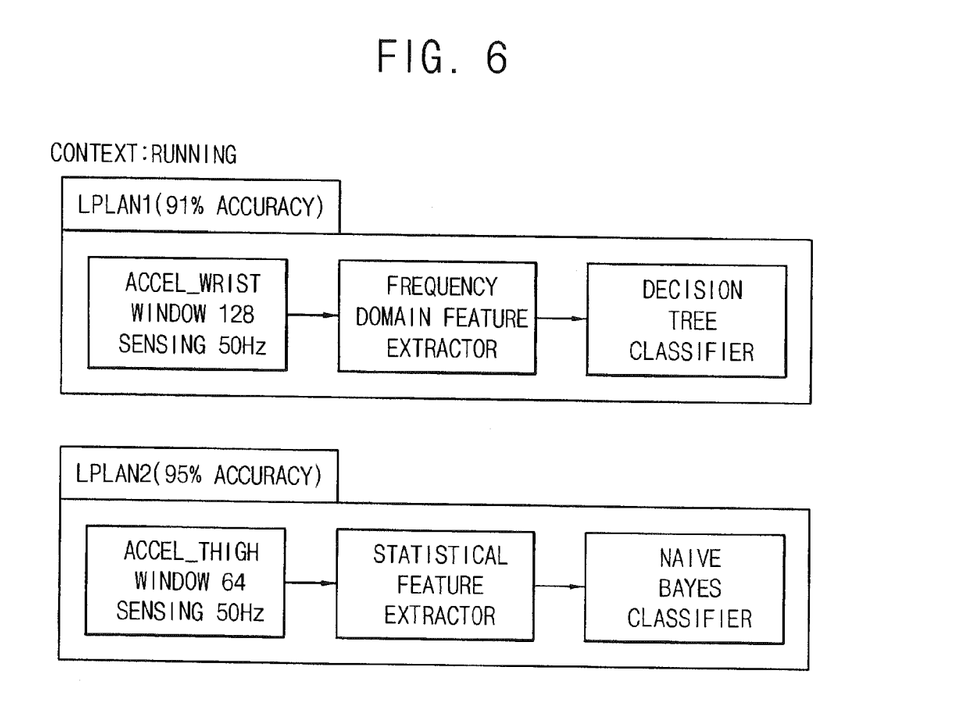
FIG. 6 is a conceptual diagram illustrating exemplary logical plans of the resource use plan of FIG. 5.
Figure 7:
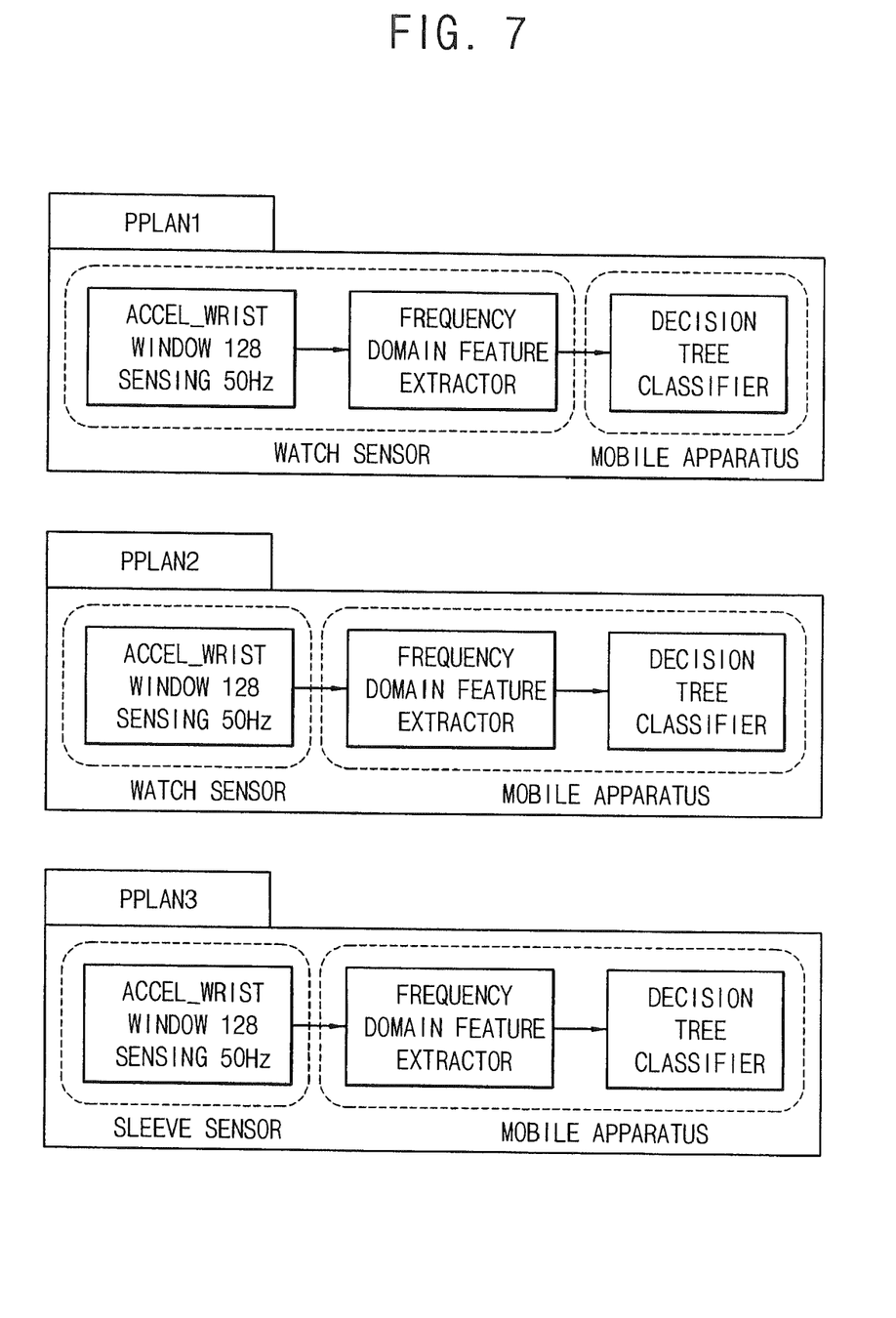
FIG. 7 is a conceptual diagram illustrating exemplary physical plans of the resource use plan of FIG. 5.

FIG. 6 is a conceptual diagram illustrating exemplary logical plans of the resource use plan of FIG. 5. FIG. 7 is a conceptual diagram illustrating exemplary physical plans of the resource use plan of FIG. 5.

Hereinafter, the exemplary logical plan LPLAN and the exemplary physical plan PPLAN are explained in detail referring to FIGS. 4 to 7.

When the CONTEXT of the CMQ of the application 300 is RUNNING, the mobile apparatus 100 determines whether a user is running or not, and outputs the event signal EVENT to the application 300.

FIG. 6 illustrates the first logical plan LPLAN1 and the second logical plan LPLAN2 generated in response to the CONTEXT of RUNNING.

The first logical plan LPLAN1 includes a step of sensing data SDATA using a wrist acceleration sensor ACCEL_WRIST, which uses Window 128, and senses in a frequency of 50 Hz. The first logical plan LPLAN1 includes a step of extracting feature data FEATURE from the sensed data SDATA using a frequency domain feature extractor. The first logical plan LPLAN1 includes a step of recognizing the CONTEXT of RUNNING from the feature data FEATURE using a decision tree classifier. The first logical plan LPLAN1 secure accuracy of 91%.

The second logical plan LPLAN2 includes a step of sensing data SDATA using a thigh acceleration sensor ACCEL_T-HIGH, which uses Window 64 and senses in a frequency of 50 Hz. The second logical plan LPLAN2 includes a step of extracting feature data FEATURE from the sensed data SDATA using a statistical feature extractor. The second logical plan LPLAN2 includes a step of recognizing the CONTEXT of RUNNING from the feature data FEATURE using Naïve Bayes classifier. The second logical plan LPLAN2 secure accuracy of 95%.

FIG. 7 illustrates the first physical plan PPLAN1, the second physical plan PPLAN2 and the third physical plan PPLAN3 generated corresponding to the first logical plan LPLAN1.

The first physical plan PPLAN1 includes a wearable watch sensor as a subject sensing the data SDATA, the wearable watch sensor as a subject extracting the feature data FEATURE, and the mobile apparatus 100 as a subject recognizing the CONTEXT of RUNNING.

The second physical plan PPLAN2 includes the wearable watch sensor as a subject sensing the data SDATA, the mobile apparatus 100 as a subject extracting the feature data FEATURE, and the mobile apparatus 100 as a subject recognizing the CONTEXT of RUNNING The third physical plan PPLAN3 includes a sleeve sensor as a subject sensing the data SDATA, the mobile apparatus 100 as a subject extracting the feature data FEATURE, and the mobile apparatus 100 as a subject recognizing the CONTEXT of RUNNING.

Figure 8:
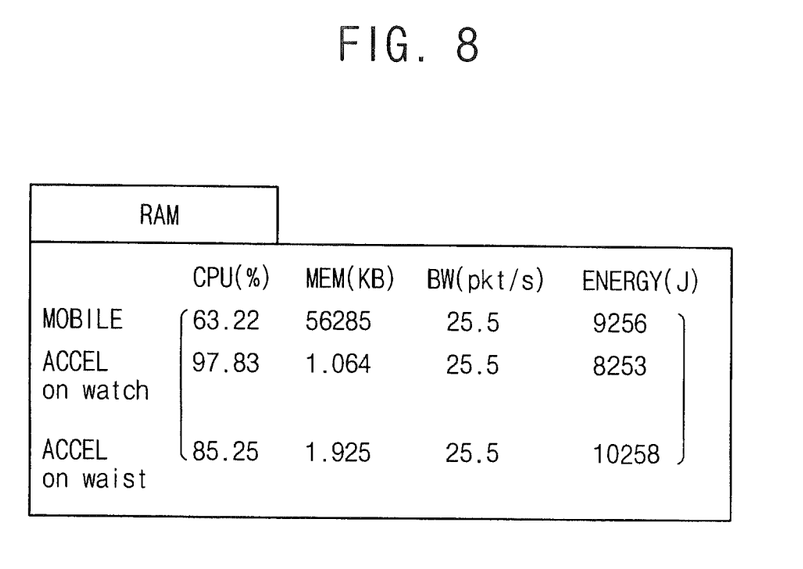
FIG. 8 is a conceptual diagram illustrating a resource availability matrix (RAM) used to select a final plan in a plan selector of FIG. 4.
Figure 9:
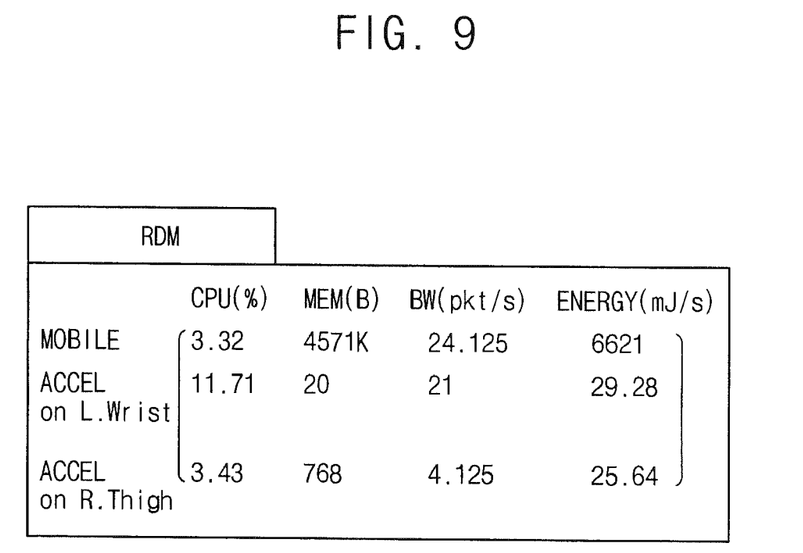
FIG. 9 is a conceptual diagram illustrating a resource demand matrix (RDM) used to select the final plan in the plan selector of FIG. 4.

FIG. 8 is a conceptual diagram illustrating a resource availability matrix (RAM) used to select a final plan in a plan selector of FIG. 4. FIG. 9 is a conceptual diagram illustrating a resource demand matrix (RDM) used to select the final plan in the plan selector of FIG. 4.

Hereinafter, the exemplary plan selector 133 and the exemplary step of selecting the final plan PLAN by the plan selector 133 are illustrated in detail referring to FIGS. 4, 8 and 9.

In the present example embodiment, a plurality of the CMQs is provided from the application 300 or from a plurality of the applications 300. The resource use plans are generated in response to the CMQs.

For example, a first context CONTEXT A is RUNNING representing whether the user is running or not, a second context CONTEXT B is STANDING POSTURE representing a posture of the user, and a third context CONTEXT C is HEART BEAT representing a heart beat rate of the user.

The plan generator 131 generates three physical plans PPLAN A1, PPLAN A2 and PPLAN A3 to recognize the first context CONTEXT A. The plan generator 131 generates four physical plans PPLAN B1, PPLAN B2, PPLAN B3 and PPLAN B4 to recognize the second context CONTEXT B. The plan generator 131 generates two physical plans PPLAN C1 and PPLAN C2 to recognize the third context CONTEXT C.

The physical plans form a physical plan set. The physical plan sets such as {PPLAN A1}, {PPLAN A2}, {PPLAN B2} may recognize the single context. The physical plan sets such as {PPLAN A1, PPLAN B1}, {PPLAN A2, PPLAN B2}, {PPLAN A3, PPLAN C1} may recognize two contexts at the same time. The physical plan sets such as {PPLAN A1, PPLAN B1, PPLAN C1}, {PPLAN A1, PPLAN B2, PPLAN C2}, {PPLAN A3, PPLAN B1, PPLAN C2} may recognize three contexts at the same time. The number of the physical plan sets may be 2P. Herein, P is the number of the physical plans. In the present example embodiment, the number of the physical plan sets may be $2^{(3+4+2)}$=512.

The plan selector 133 selects first physical plan sets processing maximum CMQs at the same time. For example, the plan selector 133 selects the first physical plan sets such as {PPLAN A1, PPLAN B1, PPLAN C1}, {PPLAN A1, PPLAN B2, PPLAN C2}, {PPLAN A3, PPLAN B1, PPLAN C2}, which may recognize three contexts at the same time. The maximum number of physical plan sets may be 3*4*2=24.

The RAM includes real-time resource availability of apparatuses such as the mobile apparatus 100 and the sensors 200 in a network. The RAM may include information about the available CPU cycle, the available network bandwidth, the available memory space and the available energy of the mobile apparatus 100 and the sensor 200.

As shown in FIG. 8, the present network includes a mobile apparatus MOBILE, an accelerometer on a watch "ACCEL on watch," and an accelerometer on a waist "ACCEL on waist." For example, the available CPU cycle CPU of the mobile apparatus MOBILE is 63.22%, the available memory space MEM is 56,285 KB, the available network bandwidth is 25.5 pkt/s, and the available energy ENERGY is 9,256 J. The available CPU cycle CPU of the accelerometer on the watch ACCEL on watch is 97.83%, the available memory space MEM is 1.064 KB, the available network bandwidth is 25.5 pkt/s, and the available energy ENERGY is 8,253 J. The available CPU cycle CPU of the accelerometer on the waist ACCEL on waist is 85.25%, the available memory space MEM is 1.925 KB, the available network bandwidth is 25.5 pkt/s, and the available energy ENERGY is 10,258 J.

The RDM includes a resource demand of the mobile apparatus 100 and the sensors 200 to execute the resource use plan. The RDM may include information about the CPU usage, the network bandwidth usage, the memory usage and the energy usage of the mobile apparatus 100 and the sensor 200.

As shown in FIG. 9, the present resource use plan is executed by the mobile apparatus MOBILE, an accelerometer on a left wrist "ACCEL on L.wrist," and an accelerometer on a right thigh "ACCEL on R.thigh." For example, the mobile apparatus MOBILE demands the CPU usage CPU of 3.32%, the memory usage MEM of 4,571 KB, the network bandwidth usage BW of 24.125 pkt/s, and the energy usage ENERGY of 6,621 mJ/s to execute the resource use plan. The accelerometer on the left wrist ACCEL on L.wrist demands the CPU usage CPU of 11.71%, the memory usage MEM of 20 B, the network bandwidth usage BW of 21 pkt/s, and the energy usage ENERGY of 29.28 mJ/s to execute the resource use plan. The accelerometer on the right thigh ACCEL on R.thigh demands the CPU usage CPU of 3.43%, the memory usage MEM of 768 B, the network bandwidth usage BW of 4.125 pkt/s, and the energy usage ENERGY of 25.64 mJ/s to execute the resource use plan.

The plan selector 133 may select the final plan PLAN of which the RDM is less than the RAM. The plan selector 133 may select the first physical plan sets of which the RDM is less than the RAM when the plurality of CMQs exists. If the resource demands of the plan or the physical plan sets are greater than the present available resources, the plan or the physical plan sets may not be executed properly, and the plan or the physical plan sets violates a resource constraint of the system.

And then, the plan selector 133 may select a final physical plan set using the minimum resources among the first physical plan sets. The plan selector 133 may use the resource use policy in the policy manager 137 to select the final physical plan set.

For example, the plan selector 133 may select a final physical plan set using the minimum energy among the first physical plan sets. The plan selector 133 may select a final physical plan set maximizing the accuracy of the context awareness among the first physical plan sets. The plan selector 133 may select a final physical plan set maximizing running duration of the application 300 among the first physical plan sets.

Figure 10:
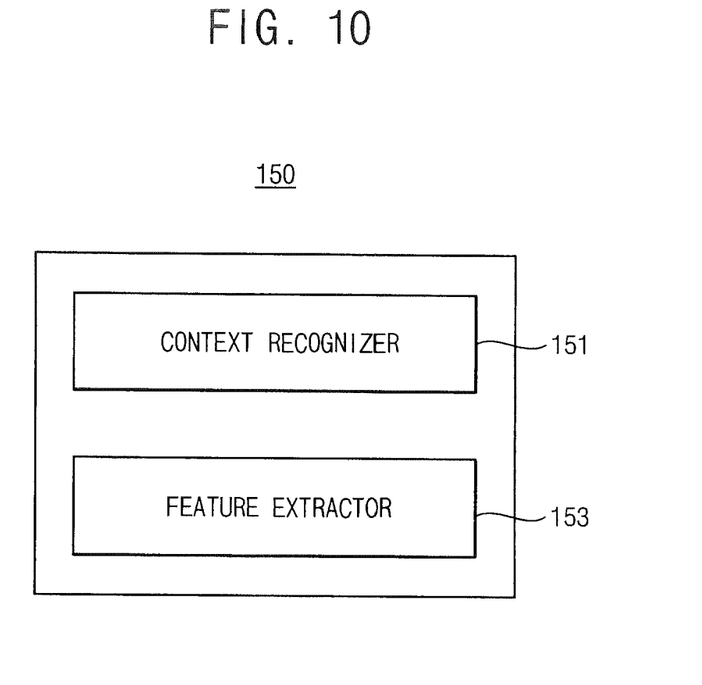
FIG. 10 is a block diagram illustrating a plan processor in the mobile apparatus of FIG. 2.

FIG. 10 is a block diagram illustrating a plan processor in the mobile apparatus of FIG. 2.

Referring to FIGS. 1, 2 and 10, the plan processor 150 includes a context recognizer 151 and a feature extractor 153.

The feature extractor 153 receives the sensed data SDATA from the sensor broker 170, and extracts the feature data FEATURE from the sensed data SDATA. The feature extractor 153 outputs the feature data FEATURE to the context recognizer 151.

For example, the feature extractor 153 may generate the frequency domain feature data or the statistic feature data. The feature extractor 153 may be not operated when the sensor 200 performs the feature extraction instead of the mobile apparatus 100 according to an instruction of the final plan PLAN.

The context recognizer 151 receives the feature data FEATURE from the feature extractor 153 or the sensor broker 170, and recognizes the CONTEXT from the feature data FEATURE. The context recognizer 151 outputs the CONTEXT to the application broker 110.

For example, the context recognizer 151 may recognize the CONTEXT using the decision tree classifier. The context recognizer 151 may recognize the CONTEXT using the Naïve Bayes classifier.

Figure 11:
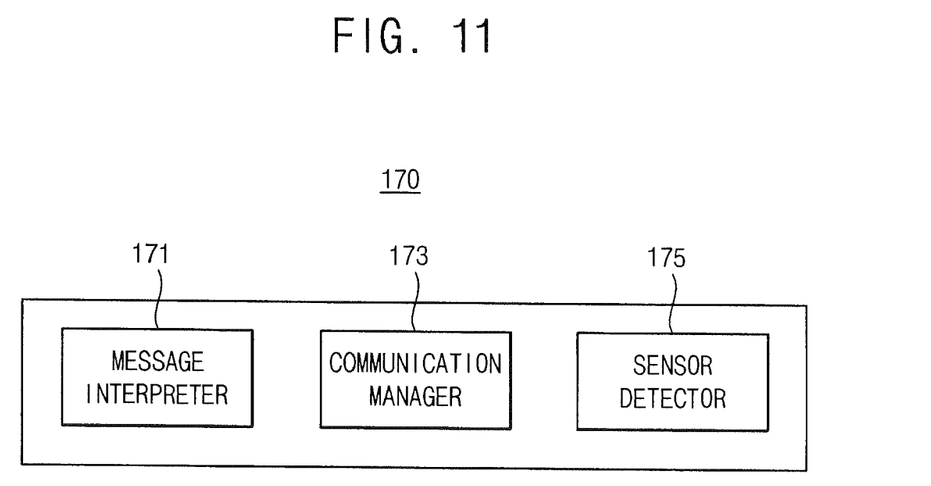
FIG. 11 is a block diagram illustrating a sensor broker in the mobile apparatus of FIG. 2.

FIG. 11 is a block diagram illustrating a sensor broker in the mobile apparatus of FIG. 2.

Referring to FIGS. 1, 2 and 11, the sensor broker 170 includes a message interpreter 171, a communication manager 173 and a sensor detector 175.

The message interpreter 171 interprets the messages communicated between the mobile apparatus 100 and the sensor 200. For example, the messages may include the sensed data SDATA, the feature data FEATURE and the resource use status STATUS of the sensor 200.

The communication manager 173 manages communication between the mobile apparatus 100 and the sensor 200.

The sensor detector 175 detects whether the sensors 200 in the network are turned on or off in real time. The sensor detector 175 outputs the detected on/off status of the sensors 200 to the processing planner 130. The processing planner 130 may generate the resource use plans based on the detected sensors 200.

Figure 12:
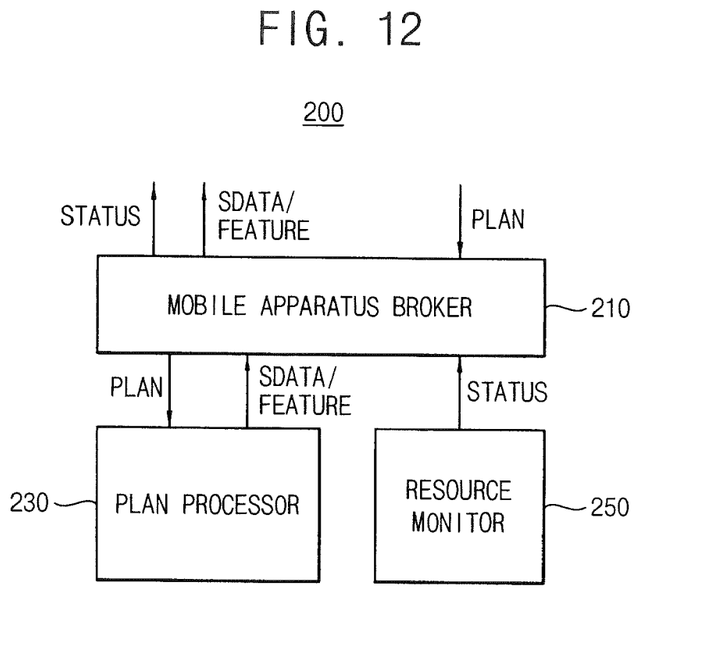
FIG. 12 is a block diagram illustrating a sensor in the context monitoring system of FIG. 1.

FIG. 12 is a block diagram illustrating a sensor in the context monitoring system of FIG. 1.

Referring to FIGS. 1 and 12, the sensor 200 includes a mobile apparatus broker 210, a plan processor 230 and a resource monitor 250.

The mobile apparatus broker 210 communicates with the mobile apparatus 100. The mobile apparatus broker 210 receives the final plan PLAN from the mobile apparatus 100, and transmits the final plan PLAN to the plan processor 230. The mobile apparatus broker 210 receives the sensed data SDATA or the feature data FEATURE from the plan processor 230, and transmits the sensed data SDATA or the feature data FEATURE to the mobile apparatus 100. The mobile apparatus broker 210 receives the resource use status STATUS of the sensor 200, and transmits the resource use status STATUS to the mobile apparatus 100.

The plan processor 230 receives the final plan PLAN from the mobile apparatus broker 210, and executes the final plan PLAN. The plan processor 230 senses data SDATA, and may extract the feature data FEATURE from the sensed data SDATA. The plan processor 230 outputs the sensed data SDATA and the feature data FEATURE to the mobile apparatus broker 210.

The resource monitor 250 monitors resource use status STATUS of the sensor 200 in real time. The resource monitor 250 outputs the resource use status STATUS of the sensor 200 to the mobile apparatus broker 210.

Figure 13:
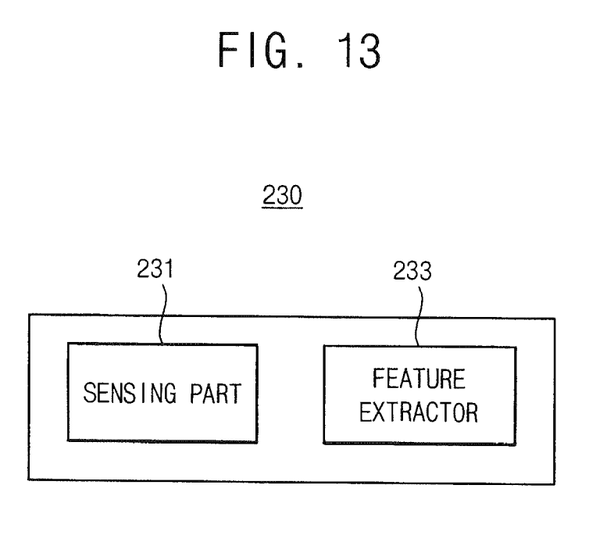
FIG. 13 is a block diagram illustrating a plan processor in the sensor of FIG. 12.

FIG. 13 is a block diagram illustrating a plan processor in the sensor of FIG. 12.

Referring to FIGS. 1, 12 and 13, the plan processor 230 includes a sensing part 231 and a feature extractor 233.

The sensing part 231 senses the data SDATA in response to the final plan PLAN. The sensing part 231 may selectively output the sensed data SDATA to the feature extractor 233 or to the mobile apparatus broker 210 according to an instruction of the final plan PLAN.

The feature extractor 233 receives the sensed data SDATA from the sensing part 231, and extracts the feature data FEATURE from the sensed data SDATA. The feature extractor 231 outputs the feature data FEATURE to the mobile apparatus broker 210.

For example, the feature extractor 231 may generate the frequency domain feature data or the statistic feature data. The feature extractor 153 may be not operated when the mobile apparatus 100 performs the feature extraction instead of the sensor 200 according to an instruction of the final plan PLAN.

Figure 14:
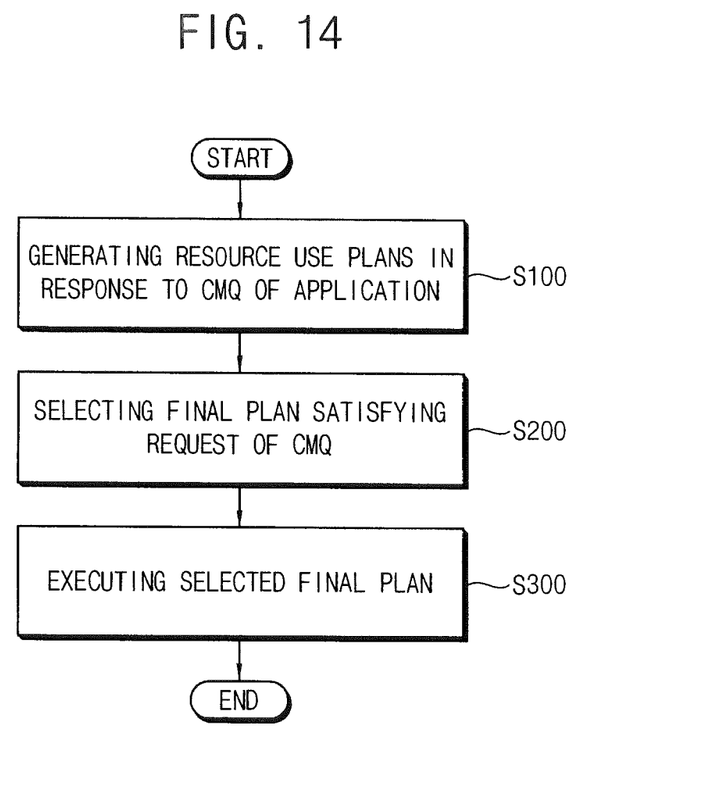
FIG. 14 is a flowchart illustrating a method of monitoring a context using the mobile apparatus of FIG. 1.

FIG. 14 is a flowchart illustrating a method of monitoring a context using the mobile apparatus of FIG. 1.

Referring to FIGS. 1 and 14, in the method of monitoring a context using the mobile apparatus 100, the mobile apparatus 100 generates a plurality of the resource use plans in response to the CMQ of the application 300 (step S100). The mobile apparatus 100 selects the final plan PLAN, which satisfies the request of the CMQ among the resource use plans (step S200). The mobile apparatus 100 and the sensor 200 execute the final plan PLAN (step S300).

Figure 15:
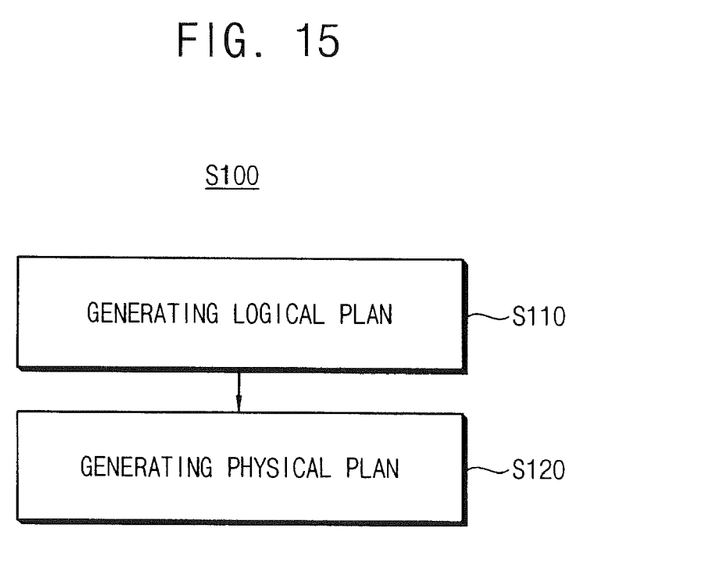
FIG. 15 is a flowchart illustrating a step of generating the resource use plans of FIG. 14.

FIG. 15 is a flowchart illustrating a step of generating the resource use plans of FIG. 14.

Referring to FIGS. 4, 5 and 15, in the step of generating the resource use plans (step S100), the plan generator 131 of the mobile apparatus 100 generates the logical plan LPLAN (step S110). The plan generator 131 generates the physical plan PPLAN (step S120).

The logical plan LPLAN includes the information about the steps required to recognize the context. The physical plan PPLAN additionally includes the information about the subjects, such as apparatuses or sensors, executing the steps to recognize the context.

For example, the logical plan LPLAN includes the first step of sensing data SDATA, the second step of extracting the feature data FEATURE from the sensed data SDATA, and the third step of recognizing the context from the feature data FEATURE. The physical plan PPLAN includes the first subject sensing the data SDATA, the second subject extracting the feature data FEATURE, and the third subject recognizing the context.

Figure 16:
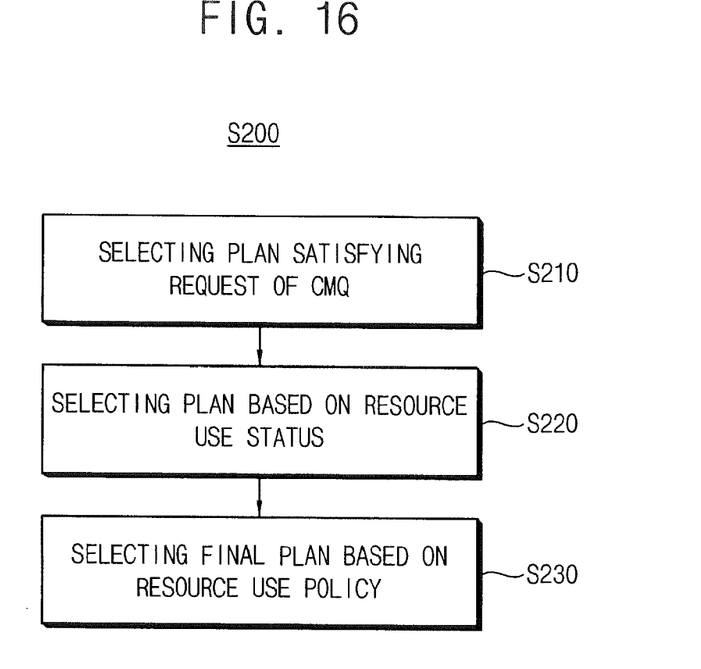
FIG. 16 is a flowchart illustrating a step of selecting the final plan of FIG. 14.

FIG. 16 is a flowchart illustrating a step of selecting the final plan of FIG. 14.

Referring to FIGS. 4, 8, 9 and 16, in the step of selecting the final plan PLAN (step S200), the plan selector 133 of the mobile apparatus 100 selects the plan, which satisfies a request of the CMQ among the resource use plans (step S210). For example, the request of the CMQ may be the accuracy of the context awareness. In addition, the request of the CMQ may include several kinds of information about overall resources of the system. For example, the request of the CMQ may include the ranges of the CPU usage, the network bandwidth usage, the memory usage and the energy usage.

The plan selector 133 may select the plan based on the resource use status of the mobile apparatus 100 monitored by the resource monitor 135 and the resource use status of the sensor 200 monitored by the resource monitor 250 (step S220). For example, the plan selector 133 may select the plan of which the RDM is less than the RAM. If the resource demand of the plan is greater than the present available resources, the plan may not be executed properly, and the plan violates a resource constraint of the system.

The RAM may include information about the available CPU cycle, the available network bandwidth, the available memory space and the available energy of the mobile apparatus 100 and the sensor 200. The RDM may include information about the CPU usage, the network bandwidth usage, the memory usage and the energy usage of the mobile apparatus 100 and the sensor 200.

The plan selector 133 may select the final plan PLAN based on the resource use policy in the policy manager 137 (step S230). For example, the resource use policy may include a policy to select the final plan PLAN to maximize the number of CMQs, which are executed at the same time, when a plurality of the CMQs exists. The resource use policy may include a policy to select the final plan PLAN to minimize the CPU usage. The policy manager 137 may include a plurality of the policies and a priority between the policies.

Alternatively, a part of the steps S210, S220 and S230 may be omitted or an order of the steps S210, S220 and S230 may be changed.

Figure 17:
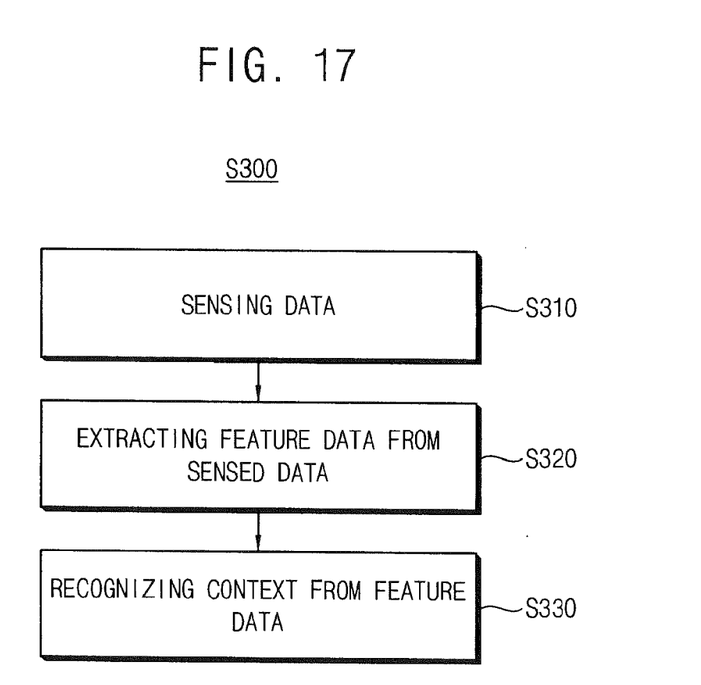
FIG. 17 is a flowchart illustrating a step of processing the final plan of FIG. 14.

FIG. 17 is a flowchart illustrating a step of processing the final plan of FIG. 14.

Referring to FIGS. 10, 13 and 17, in the step of executing the final plan PLAN (step S300), the sensing part 231 of the sensor 200 senses the data SDATA (step S310). The feature extractor 153 of the mobile apparatus 100 or the feature extractor 233 of the sensor 200 extract the feature data FEATURE from the sensed data SDATA (step S320). The context recognizer 151 recognizes the CONTEXT from the feature data FEATURE (step S330).

As explained above, the step of extracting the feature data FEATURE (step S320) may be selectively executed by the mobile apparatus side 100 or the sensor side 200 according to an instruction of the final plan PLAN.

Alternatively, the mobile apparatus 100 may include the sensing part so that the step of sensing the data SDATA (step S310) may be selectively executed by the mobile apparatus side 100 or the sensor side 200 according to an instruction of the final plan PLAN.

Alternatively, the sensor 200 may include the context recognizer so that the step of recognizing the CONTEXT (step S330) may be selectively executed by the mobile apparatus side 100 or the sensor side 200 according to an instruction of the final plan PLAN.

According to the present inventive concept as explained above, resource use plans are generated, a final plan which satisfies a request of the CMQ is selected among the resource use plans, and the final plan is executed. Thus, a coordinated and efficient use of limited resources may be achieved. In addition, seamless and long-running services may be provided.

The foregoing is illustrative of the present inventive concept and is not to be construed as limiting thereof. Although a few example embodiments of the present inventive concept have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the specific example embodiments disclosed, and that modifications to the disclosed example embodiments, as well as other example embodiments, are intended to be included within the scope of the appended claims. The present inventive concept is defined by the following claims, with equivalents of the claims to be included therein.

What is claimed is:

1. A mobile apparatus comprising:
   a processing planner configured to generate a plurality of resource use plans in response to a context monitoring query (CMQ) of an application and configured to select a final plan that satisfies a request of the CMQ among the resource use plans; and
   a plan processor configured to execute the final plan,
   wherein each resource use plan comprises:
      a logical plan that includes information about steps to recognize a context, the steps including a first step of sensing data, a second step of extracting feature data from the sensed data, and a third step of recognizing the context from the feature data; and
      a physical plan that includes information about subjects executing the steps, the subjects including a first subject sensing the data, a second subject extracting the feature data, and a third subject recognizing the context,
   wherein the resource use plans include a plurality of the logical plans for a single context, and wherein the resource use plans include a plurality of the physical plans for a single logical plan.

2. The mobile apparatus of claim 1, wherein the mobile apparatus is used in a personal area network (PAN) environment.

3. The mobile apparatus of claim 1, further comprising an application broker configured to communicate with the application.

4. The mobile apparatus of claim 1, further comprising a sensor broker configured to communicate with a sensor, the sensor providing sensed data.

5. The mobile apparatus of claim 1, wherein the subjects include the mobile apparatus and a sensor.

6. The mobile apparatus of claim 1, wherein the processing planner detects an available sensor in real time, and generates the resource use plans based on the detected available sensor.

7. The mobile apparatus of claim 1, wherein the processing planner comprises a resource monitor configured to monitor resource use status of the mobile apparatus in real time, and the processing planner selects the final plan based on the resource use status of the mobile apparatus and the sensor.

8. The mobile apparatus of claim 7, wherein the processing planner compares resource availability matrix (RAM) of the mobile apparatus and a sensor in a network to resource demand matrix (RDM) of the resource use plans to select the final plan.

9. The mobile apparatus of claim 8, wherein the processing planner selects the final plan of which the RDM is less than the RAM.

10. The mobile apparatus of claim 8, wherein the RAM includes information about available CPU cycle, available network bandwidth, available memory space and available energy of the mobile apparatus and the sensor in the network.

11. The mobile apparatus of claim 8, wherein the RDM includes information about CPU usage, network bandwidth usage, memory usage and energy usage demanded by the mobile apparatus and the sensor to execute the resource use plan.

12. The mobile apparatus of claim 1, wherein the processing planner comprises a policy manager that stores a resource use policy defining criteria for selecting the final plan, and the processing planner selects the final plan based on the resource use policy stored in the policy manager.

13. The mobile apparatus of claim 1, wherein the processing planner generates a plurality of plan sets that have the resource use plans when a plurality of CMQs exists, the processing planner selects a plurality of first plan sets to maximize the number of CMQs, which are executed at the same time, and the processing planner selects a final plan set using the minimum resources among the first plan sets.

14. The mobile apparatus of claim 1, wherein the plan processor comprises:
a feature extractor configured to extract feature data from sensed data by a sensor; and
a context recognizer configured to recognize a context from the extracted feature data.

15. The mobile apparatus of claim 1, wherein the CMQ includes accuracy of context awareness and duration of monitoring a context.

16. A method of monitoring a context, the method comprising:
generating a plurality of resource use plans in response to a context monitoring query (CMQ) of an application;
selecting a final plan that satisfies a request of the CMQ among the resource use plans; and
executing the final plan,
wherein generating each resource use plan comprises:
generating a logical plan that includes information about steps to recognize the context, the steps including a first step of sensing data, a second step of extracting feature data from the sensed data, and a third step of recognizing the context from the feature data; and
generating a physical plan that includes information about subjects executing the steps, the subjects including a first subject sensing the data, a second subject extracting the feature data, and a third subject recognizing the context,
wherein the resource use plans include a plurality of the logical plans for a single context, and
wherein the resource use plans include a plurality of the physical plans for a single logical plan.

17. The method of claim 16, wherein the method of monitoring the context is used in a personal area network (PAN) environment.

18. The method of claim 16, wherein the subjects include the mobile apparatus and a sensor.

19. The method of claim 16, wherein generating the resource use plans comprises:
detecting an available sensor in real time; and
generating the resource use plans based on the detected available sensor.

20. The method of claim 16, wherein the final plan is selected based on a resource use status monitored in real time.

21. The method of claim 20, wherein selecting the final plan comprises comparing resource availability matrix (RAM) of the mobile apparatus and a sensor in a network to resource demand matrix (RDM) of the resource use plans.

22. The method of claim 21, wherein the final plan of which the RDM is less than the RAM is selected.

23. The method of claim 22, wherein the RAM includes information about available CPU cycle, available network bandwidth, available memory space and available energy of the mobile apparatus and the sensor in the network.

24. The method of claim 22, wherein the RDM includes information about CPU usage, network bandwidth usage, memory usage and energy usage demanded by the mobile apparatus and the sensor to execute the resource use plan.

25. The method of claim 16, wherein the final plan is selected based on a resource use policy defining criteria for selecting the final plan.

26. The method of claim 16, wherein selecting the final plan comprises:
generating a plurality of plan sets that have the resource use plans when a plurality of CMQs exists;
selecting a plurality of first plan sets to maximize the number of CMQs, which are executed at the same time; and
selecting a final plan set that uses the minimum resources among the first plan sets.

27. The method of claim 16, wherein executing the final plan comprises:
sensing data by a first subject designated according to an instruction of the final plan;
extracting feature data from the sensed data by a second subject designated according to an instruction of the final plan; and
recognizing the context from the extracted feature data by a third subject designated according to an instruction of the final plan.

28. The method of claim 16, wherein the CMQ includes accuracy of context awareness and duration of monitoring a context.

29. A context monitoring system comprising:
an application configured to request a context monitoring query (CMQ) and configured to receive an event signal when the CMQ is satisfied;
a mobile apparatus including a processing planner configured to generate a plurality of resource use plans in response to the CMQ of the application and configured to select a final plan that satisfies a request of the CMQ among the resource use plans, and a plan processor executing the final plan; and
a sensor configured to execute the final plan,
wherein each resource use plan comprises:
- a logical plan that includes information about steps to recognize a context, the steps including a first step of sensing data, a second step of extracting feature data from the sensed data, and a third step of recognizing the context from the feature data; and
- a physical plan that includes information about subjects executing the steps, the subjects including a first subject sensing the data, a second subject extracting the feature data, and a third subject recognizing the context, wherein the resource use plans include a plurality of the logical plans for a single context, and
wherein the resource use plans include a plurality of the plans for a single logical plan.

30. The context monitoring system of claim 29, wherein the context monitoring system is used in a personal area network (PAN) environment.

31. The context monitoring system of claim 29, wherein the sensor comprises:
- a mobile apparatus broker configured to communicate with the mobile apparatus;
- a plan processor configured to execute the final plan; and
- a resource monitor configured to monitor resource use status of the sensor in real time.

32. The context monitoring system of claim 31, wherein the plan processor comprises:
- a sensing part configured to sense data; and
- a feature extractor configured to extract feature data from the sensed data.

* * * * *